(12) United States Patent
Shao et al.

(10) Patent No.: US 12,120,184 B2
(45) Date of Patent: Oct. 15, 2024

(54) METHODS, INTERNET OF THINGS SYSTEMS AND MEDIUMS FOR CONTROLLING DATA TRANSMISSION FOR SMART GAS

(71) Applicant: CHENGDU QINCHUAN IOT TECHNOLOGY CO., LTD., Sichuan (CN)

(72) Inventors: Zehua Shao, Chengdu (CN); Junyan Zhou, Chengdu (CN); Xiaojun Wei, Chengdu (CN); Lei He, Chengdu (CN); Quan Wang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/414,427

(22) Filed: Jan. 16, 2024

(65) Prior Publication Data

US 2024/0155031 A1    May 9, 2024

(30) Foreign Application Priority Data

Dec. 27, 2023   (CN) .......................... 202311818510.5

(51) Int. Cl.
  *H04L 67/12* (2022.01)
  *G06Q 50/06* (2024.01)
  (Continued)

(52) U.S. Cl.
  CPC ............. *H04L 67/12* (2013.01); *G06Q 50/06* (2013.01); *G16Y 10/35* (2020.01); *G16Y 20/30* (2020.01); *G16Y 40/20* (2020.01)

(58) Field of Classification Search
  CPC ........ H04L 67/12; G06Q 50/06; G16Y 10/35; G16Y 20/30; G16Y 40/20; G16Y 40/35;
  (Continued)

(56) References Cited

U.S. PATENT DOCUMENTS 9,021,200 B1 *  4/2015  Kushmerick ....... G06F 12/0215
                                                                711/170
11,838,704 B1   12/2023  Fu
                        (Continued)

FOREIGN PATENT DOCUMENTS

CN      101960222 A    1/2011
CN      107390569 A    11/2017
                        (Continued)

OTHER PUBLICATIONS

Tang Qiang, Research and Design of Power Data Acquisition Scheme Based on NB-IoT, Telecom Power Technology, 36:(12), 2019, 3 pages.
(Continued)

*Primary Examiner* — Soe Hlaing
(74) *Attorney, Agent, or Firm* — METIS IP LLC

(57) ABSTRACT

The present disclosure provides a method comprising obtaining gas data of a gas user continuously, and storing the gas data into a storage unit; predicting a probability of full storage of the storage unit within a preset future time period based on a historical data increment of the storage unit; in response to the probability of full storage meeting a preset probability condition: obtaining the gas data of the gas user within the preset time period from the storage unit; determining an upload demand degree of the gas data based on the gas data; and in response to the upload demand degree meeting a preset condition, transmitting the gas data within the preset time period to a smart gas management platform based on a smart gas object platform at a target upload time point of a smart gas meter of the gas user.

7 Claims, 4 Drawing Sheets

(51) Int. Cl.
*G16Y 10/35* (2020.01)
*G16Y 20/30* (2020.01)
*G16Y 40/20* (2020.01)

(58) Field of Classification Search
CPC .... G06F 18/213; H04Q 9/00; H04Q 2209/60; H04Q 2209/70
See application file for complete search history.

(56) References Cited

U.S. PATENT DOCUMENTS

| | | | |
|---|---|---|---|
| 2008/0317026 A1 | 12/2008 | Vogl et al. | |
| 2012/0023372 A1 | 1/2012 | Lin et al. | |
| 2021/0334913 A1* | 10/2021 | Klein | G01F 15/06 |
| 2022/0214203 A1 | 7/2022 | Shao et al. | |
| 2023/0332935 A1 | 10/2023 | Shao et al. | |

FOREIGN PATENT DOCUMENTS

| | | | | |
|---|---|---|---|---|
| CN | 109448250 A | | 3/2019 | |
| CN | 109544853 A | | 3/2019 | |
| CN | 109982288 A | | 7/2019 | |
| CN | 107993357 B | | 7/2020 | |
| CN | 212160825 U | | 12/2020 | |
| CN | 112312438 A | | 2/2021 | |
| CN | 112735113 A | | 4/2021 | |
| CN | 113709593 A | * | 11/2021 | ............... H04Q 9/00 |
| CN | 113783962 A | | 12/2021 | |
| CN | 115879913 A | | 3/2023 | |
| CN | 116091080 A | | 5/2023 | |
| CN | 116208674 A | | 6/2023 | |
| CN | 116308965 A | | 6/2023 | |
| CN | 116664019 A | | 8/2023 | |
| CN | 116719787 A | | 9/2023 | |
| JP | 3119236 U | | 2/2006 | |
| WO | 2023030513 A1 | | 3/2023 | |
| WO | 2023226277 A1 | | 11/2023 | |

OTHER PUBLICATIONS

Li Bin et al., Scheduling Strategy of Demand Response Business Based on Fuzzy Logic Based Improved Weighted Fair Queuing, Automation of Electric Power Systerms, 44:(2), 60-67, 2020.

Gao Bin, Common Problems Existing in Data Transmission of Automatic Stage Gauging Stations and Treatment, Energy and Energy Conservation, 2017, 3 pages.

Yu Haifeng et al., Analysis of Energy Consumption Monitoring and Management System Construction Based on Wireless Access Technology, Telecommunications Technology, 2012, 6 pages.

Sha Lin et al., Dynamic Cache Scheduling Algorithm in the Smart Grid Server, Transaction of China Electrotechnical Society, 30:(1), 2015, 5 pages.

Li Tingting, Design of Fake-Offline Self-Recovery System for Large-Scale IoT Devices in Smart Home, Technology of IoT & AI, 54:(3), 24-29, 2022.

Wang Xinxin et al., Analysis and Discussion on General Technical Requirements of Multi-Parameter Water Meter, Process Automation Instrumentation, 44:(3), 2023, 5 pages.

Feng Zhai et al., A User Peak Load Staggering Potential Assessment Method Based on Three-demarcation Analytic Hierarchy Process, 2016 10th International Conference on Software, Knowledge, Information Management & Applications (SKIMA), 262-266, 2016.

MacArena Martin Almenta et al., An Aggregated Fridge-freezer Peak Shaving and Valley Filling Control Strategy for Enhanced Grid Operations, 2015 IEEE Power & Energy Society General Meeting, 2015, 5 pages.

"Technical Requirements for Data Acquisition Terminals of Energy Metering", Web page <http://bzh.scjgj.beijing.gov.cn/bzh/apifile/file/2021/20210325/979fb314-a1f3-4b22-9475-c86a478f8e5b.PDF>, Jun. 29, 2017, 27 pages.

First Office Action in Chinese Application No. 202311818510.5 mailed on Feb. 1, 2024, 19 pages.

Notification to Grant Patent Right for Invention in Chinese Application No. 202311818510.5 mailed on Feb. 22, 2024, 5 pages.

* cited by examiner

METHODS, INTERNET OF THINGS SYSTEMS AND MEDIUMS FOR CONTROLLING DATA TRANSMISSION FOR SMART GAS

CROSS-REFERENCE TO RELATED APPLICATIONS

This application claims priority to Chinese Patent Application No. CN CN202311818510.5, filed on Dec. 27, 2023, the entire contents of which are hereby incorporated by reference.

TECHNICAL FIELD

The present disclosure relates to the field of data management, and in particular relates to a method, an Internet of Things (IoT) system, and a medium for controlling data transmission for smart gas.

BACKGROUND

With the increasing coverage of the gas pipeline network, a greater number of gas metering management terminals such as smart gas meters and flow meters are connected. As the volume of gas data gradually increases, there is often a situation where the gas metering management terminals concentrate on uploading an excessive amount of data, resulting in channel congestion at the base station. This affects the efficiency of data uploading and may lead to data loss. Such a scenario is not conducive to the management of gas business, nor to the timely detection and treatment of gas faults.

In response to the question of how to reasonably arrange and allocate a time for uploading data of a gas meter in order to realize smooth uploading of data of a gas meter, CN109448250A discloses a method for dynamically selecting a time of data uploading, wherein data that fails to be uploaded at a preset point in time will be uploaded again according to a randomized time interval, and the above steps are repeated if it fails. However, the method is not only inefficient, but also fails to screen out data that may have gas-related problems for prioritized uploading.

There is therefore an urgent need to provide a method for controlling data transmission for smart gas, an Internet of Things system, and a medium, which evaluates the data of a gas meter and arranges the data uploading points in an orderly manner based on the evaluation results, realizing a staggered uploading and reducing the potential gas risk.

SUMMARY

The present disclosure includes a method for controlling data transmission for smart gas. The method for controlling data transmission for smart gas comprises: obtaining gas data of a gas user continuously, and storing the gas data into a storage unit; predicting a probability of full storage of the storage unit within a preset future time period based on a historical data increment of the storage unit; in response to the probability of full storage meeting a preset probability condition: obtaining the gas data of the gas user within the preset time period from the storage unit; determining an upload demand degree of the gas data based on the gas data; and in response to the upload demand degree meeting a preset condition, transmitting the gas data within the preset time period to a smart gas management platform based on a smart gas object platform at a target upload time point of a smart gas meter of the gas user, wherein the target upload time point is the next most recent upload time point in a set of upload time points of the smart gas meter, and the set of upload time points is periodically determined by the smart gas management platform in a preset cycle and sent down to the smart gas meter.

The present disclosure includes an Internet of Things (IoT) system for controlling data transmission for smart gas, the IoT system for controlling data transmission for smart gas being capable of performing the method for controlling data transmission for smart gas, which comprises: obtaining gas data of a gas user continuously, and storing the gas data into a storage unit; predicting a probability of full storage of the storage unit within a preset future time period based on a historical data increment of the storage unit; in response to the probability of full storage meeting a preset probability condition: obtaining the gas data of the gas user within the preset time period from the storage unit; determining an upload demand degree of the gas data based on the gas data; and in response to the upload demand degree meeting a preset condition, transmitting the gas data within the preset time period to a smart gas management platform based on a smart gas object platform at a target upload time point of a smart gas meter of the gas user, wherein the target upload time point is the next most recent upload time point in a set of upload time points of the smart gas meter, and the set of upload time points is periodically determined by the smart gas management platform in a preset cycle and sent down to the smart gas meter.

The present disclosure includes a non-transitory computer-readable storage medium, comprising a set of instructions, wherein when a computer reads the computer instructions in the storage medium, the method for controlling data transmission for smart gas is implemented.

DETAILED DESCRIPTION

The accompanying drawings, which are required to be used in the description of the embodiments, are briefly described below. The accompanying drawings do not represent the entirety of the embodiments.

Unless the context clearly suggests an exception, the words "one," "a," "kind," and/or "the" do not refer specifically to the singular. In general, the terms "including" and "comprising" only suggest the inclusion of clearly identified steps and elements, which do not constitute an exclusive list, and the method or apparatus may also include other steps or elements.

When describing the operations performed in the embodiments of the present disclosure in terms of steps, the order of the steps is interchangeable. The steps may be omitted, and other steps may be included in the process of the operation if not otherwise specified.

Because of the limited time of the day and the huge amount of data in the gas network, if not uploaded in a reasonable manner, it is very likely to lead to problems such as data collision or data loss, which in turn creates the danger of potential gas problems not being solved in time. CN109448250A achieves staggered uploads only by constantly selecting random intervals to repeatedly try to upload data, which is inefficient in data upload processing and does not achieve a reasonable allocation of upload time points. There is still a risk of data collision.

The method for controlling data transmission for smart gas proposed in the embodiment of this disclosure not only scientifically plans the upload time point, but also reasonably allocates the upload priority of different types of gas meter data with different degrees of urgency. It may realize staggered peak uploads while reducing potential gas risks, detecting gas problems in a timely manner, and maintaining the smooth operation of the gas pipeline network.

Figure 1:
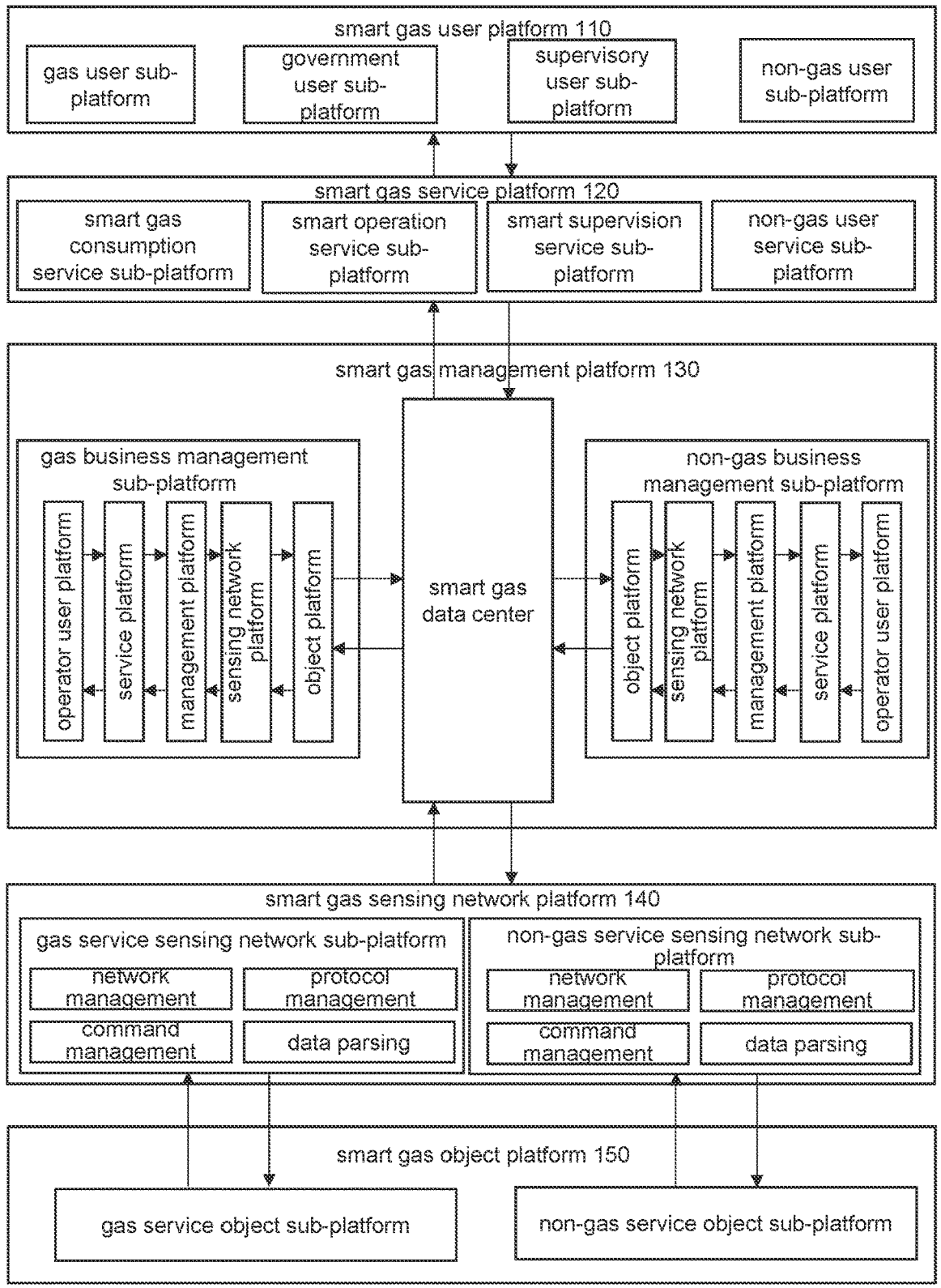
FIG. 1 is a schematic diagram of an application scenario of the Internet of Things (IoT) system for controlling data transmission for smart gas according to some embodiments of the present disclosure.

FIG. 1 is a schematic diagram of an application scenario of the Internet of Things (IoT) system for controlling data transmission for smart gas according to some embodiments shown in the present disclosure. The Internet of Things (IoT) system for controlling data transmission for smart gas covered by the embodiments of the present disclosure will be described in detail below. It should be noted that the following embodiments are used only for explaining the present disclosure and do not constitute a limitation of the present disclosure.

In some embodiments, as shown in FIG. 1, the Internet of Things (IoT) system for controlling data transmission for smart gas 100 may include a smart gas user platform 110, a smart gas service platform 120, a smart gas management platform 130 connected in sequence, a smart gas sensing network platform 140, and a smart gas object platform 150.

The smart gas user platform 110 may be a platform for interacting with a user. In some embodiments, the smart gas user platform 110 may be configured as a terminal device.

In some embodiments, the smart gas user platform 110 may include a gas user sub-platform, a government user sub-platform, a supervisory user sub-platform, and a non-gas user sub-platform.

The gas user sub-platform may be a platform that provides the gas users with data related to gas usage as well as solutions to gas problems. The gas user may be industrial gas users, commercial gas users, ordinary gas users.

The government user sub-platform may be a platform that provides gas operation-related data for government users. The government user may be a manager (e.g., an administrator of the administration department) of a gas operation entity, etc.

The supervisory user sub-platform may be a platform for supervisory users to oversee the operation of the entire IoT system. The supervisory user may be a person in the safety management department.

The non-gas user sub-platform may be a platform that provides data for non-gas users. The non-gas user may be a customer service agent, maintenance person, etc.

The smart gas service platform 120 may be a platform for conveying user's demands and control information. The smart gas service platform 120 may obtain the gas data from the smart gas management platform 130 (e.g., a smart gas data center) and send it to the smart gas user platform 110.

In some embodiments, the smart gas service platform 120 may include a smart gas consumption service sub-platform, a smart operation service sub-platform, a smart supervision service sub-platform, and a non-gas user service sub-platform.

The smart gas consumption service sub-platform may be a platform that provides gas services to the gas users.

The smart operation service sub-platform may be a platform that provides government users with gas operation-related information.

The smart supervision service sub-platform may be a platform that meets the supervision needs of supervisory users.

The non-gas user service sub-platform may be a platform that provides information related to the gas network for non-gas users.

The smart gas management platform 130 may coordinate and harmonize the connection and collaboration between various functional platforms, and aggregate all the information of the Internet of Things (IoT), providing perception management and control management functions for the IoT operational system.

The smart gas management platform 130 includes a gas business management sub-platform, a non-gas business management sub-platform and a smart gas data center.

The gas business management sub-platform may be a platform for processing business information related to gas. In some embodiments, the gas business management sub-platform may include a smart gas business management internal IoT. The smart gas business management internal IoT includes an object platform, a sensing network platform, a management platform, a service platform, and an operator user platform. The internal IoT for smart gas business management may obtain data related to management information from the smart gas data center through the object platform, determine the management decisions for the smart gas business through the operation of the internal IoT, and then send the smart gas business management decisions to the smart gas data center by the object platform.

The non-gas business management sub-platform may be a platform for processing business information not related to gas. In some embodiments, the non-gas business management sub-platform may include a non-gas business management internal IoT. The non-gas business management internal IoT includes an object platform, a sensing network platform, a management platform, a service platform, and an operator user platform. The internal IoT for non-gas business management may obtain management information-related data from the smart gas data center through the object platform, and determine the management decisions for non-gas businesses through the operation of the internal IoT, then send the non-gas business management decisions to the smart gas data center through the object platform.

The establishment of the internal IoT of the management sub-platform effectively distinguishes the rules of operation between internal information of the management platform and external information, ensuring the validity and data security of the management.

The smart gas data center may be used for storing and managing all operational information for the Internet of Things (IoT) system for controlling data transmission for smart gas 100. In some embodiments, the smart gas data center may be configured as a storage device for storing, among other things, data related to the gas data. For example, the gas data, demand levels for upload, uploaded point sets, and the like.

The gas business management sub-platform interacts bi-directionally with the smart gas data center, the non-gas business management sub-platform interacts bi-directionally with the smart gas data center, and the gas business management sub-platform and the non-gas business management sub-platform obtain data from the smart gas data center and feedback corresponding operational information.

In some embodiments, the smart gas management platform 130 may interact with the smart gas service platform 120, and the smart gas sensing network platform 140, respectively, through the smart gas data center. For another example, the smart gas data center may send an instruction to obtain the gas data to the smart gas sensing network platform 140 to obtain the gas data.

The smart gas sensing network platform 140 may be a functional platform that manages sensing communications. In some embodiments, the smart gas sensing network platform 140 may be a functional platform for sensing communications for sensing information and sensing communications for controlling information.

The smart gas sensing network platform 140 may include a gas service sensing network sub-platform and a non-gas service sensing network sub-platform.

The gas service sensing network sub-platform may be used for network management, protocol management, command management and data parsing.

The non-gas service sensing network sub-platform may be used for network management, protocol management, command management and data parsing.

The smart gas object platform 150 may be a functional platform for sensing information generation and controlling information execution. For example, the smart gas object platform 150 may acquire the gas data and transmit it to the smart gas management platform 130 via the smart gas sensing network platform 140.

The smart gas object platform 150 may include a gas service object sub-platform and a non-gas service object sub-platform.

The gas service object sub-platform is a platform used to collect and upload data related to the gas users.

The non-gas service object sub-platform is a platform used to collect and upload data related to the non-gas users.

Some embodiments of the present disclosure, based on the Internet of Things (IoT) system for controlling data transmission for smart gas 100, may form a closed loop of information operation between the smart gas object platform and the smart gas user platform, and under the unified management of the smart gas management platform, which coordinates and operates regularly, realizing the informatization and intelligence of the data transmission and control used for smart gas.

Figure 2:
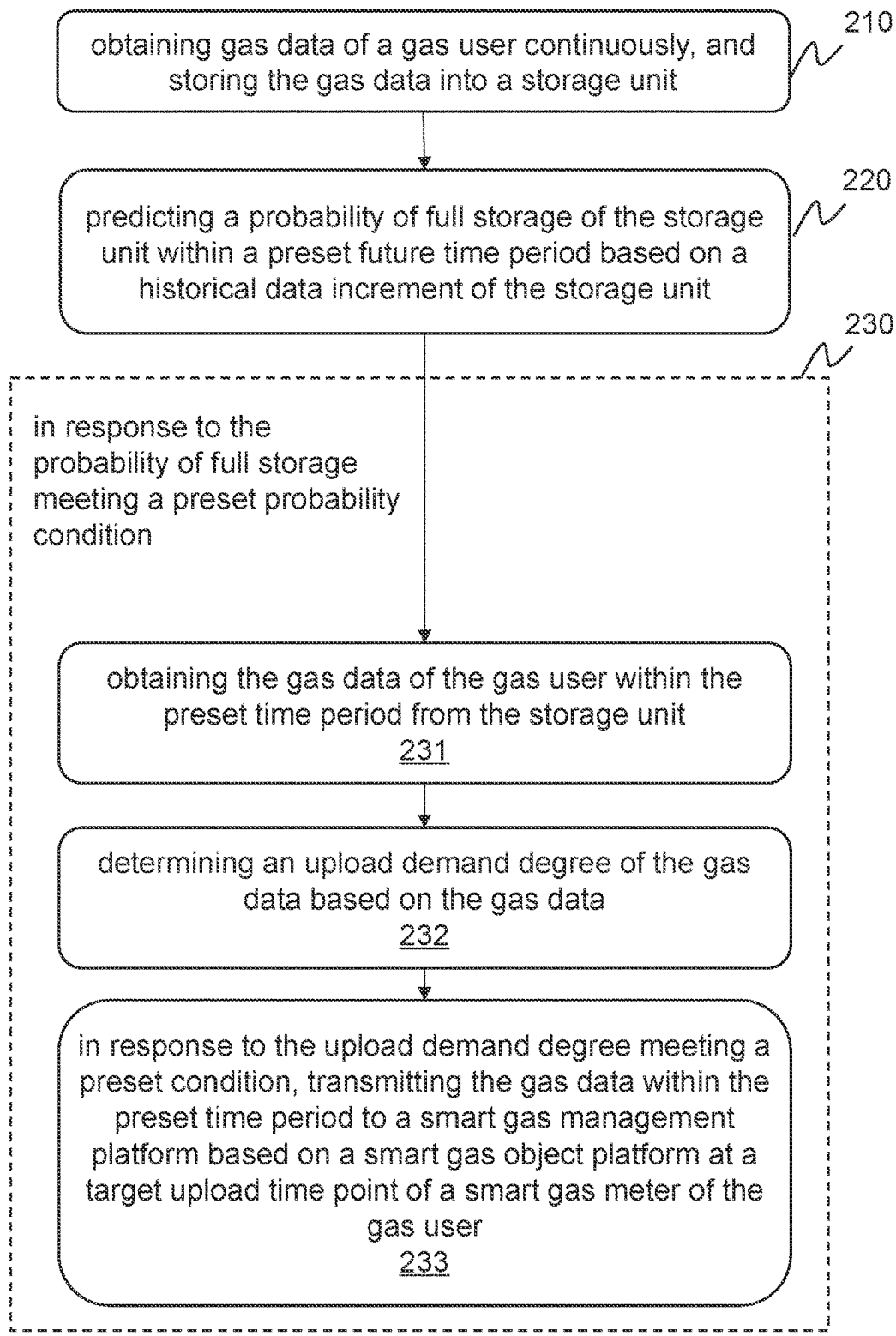
FIG. 2 is an exemplary flowchart of the method for controlling data transmission for smart gas according to some embodiments of the present disclosure.

FIG. 2 shows an exemplary flowchart of the method for controlling data transmission for smart gas according to some embodiments of the present disclosure. In some embodiments, a process 200 may be performed by the Internet of Things (IoT) system for controlling data transmission for smart gas (referred to as the IoT system for ease of description). As shown in FIG. 2, process 200 includes the following steps.

Step 210, obtaining gas data of a gas user continuously, and storing the gas data into a storage unit.

The gas data refers to the data related to gas. For example, the gas data may include the gas usage, the frequency of gas usage, etc.

The storage unit refers to a basic unit of the memory, and the memory may include a plurality of storage units, which may be integrated into a smart gas meter of a gas user. The storage unit may be used to store the gas data.

In some embodiments, the IoT system may obtain the gas data based on the smart gas business object platform and store the gas data in the storage unit. The smart gas business object platform may be configured as a smart gas meter, a sensing, etc.

Step 220, predicting a probability of full storage of the storage unit within a preset future time period based on a historical data increment of the storage unit.

The historical data increment of the storage unit refers to the increase in the amount of data stored within a storage unit over at least one historical moment in the past.

The probability of full storage is the probability of full storage occurrence in a storage unit. Full store refers to the data stored in a storage unit reaching the upper limit of the storage unit's data capacity.

In some embodiments, the smart gas service platform may use the historical data increment of the storage unit as a training sample, take the probability of full storage corresponding to the historical data increment of the storage unit as a training label, and use the current data volume of the storage unit and the upper limit of the storage unit's data capacity as inputs to determine the probability of full storage through a full storage prediction model. The full storage prediction model may be a machine learning model, such as a Long Short Term Memory (LSTM) network model etc.

Step 230, in response to the probability of full storage meeting a preset probability condition, performing steps 231 to 233:

The preset probability condition is a judgment condition on whether the probability of full storage meets the preset requirements.

In some embodiments, when the probability of full storage is greater than a preset probability threshold, it is considered to satisfy the preset probability condition. The preset probability threshold may be based on manual settings.

Step 231, obtaining the gas data of the gas user within the preset time period from the storage unit.

The preset time period is a time period from the time point when the gas data was last uploaded in history to the current time point.

In some embodiments, the smart gas meter may transmit gas data temporarily stored in a storage unit of the smart gas meter to the smart gas object platform.

Step 232, determining an upload demand degree of the gas data based on the gas data.

The upload demand degree is a numerical value that may reflect the priority of the gas data upload. The upload demand degree may be expressed as a number from 0 to 10, where the higher the value, the higher the upload demand degree, indicating that the gas data needs to be uploaded sooner.

In some embodiments, the IoT system may determine the feature of data to be uploaded of a gas user and a feature of gas usage behavior based on the gas data in a preset time period, and based on the feature of data to be uploaded and the feature of gas usage behavior, determine the upload demand degree.

The data to be uploaded is gas data that needs to be uploaded. For example, the data to be uploaded may be newly generated gas data that has accumulated since the last data upload up to the current moment. The feature of the data to be uploaded refers to relevant information that may reflect a feature of the data to be uploaded. The feature of the data to be uploaded may include a number of dimensions of the data to be uploaded, a data volume of the data to be uploaded, and user behavior data corresponding to the data to be uploaded. The IoT system may obtain the feature of the data to be uploaded by performing mathematical statistics on the gas data to be uploaded.

The feature of gas usage behavior refers to a feature related to the change of gas usage by the user. The feature of gas usage behavior may include a change rate of gas usage and a frequency of gas usage by the user, etc.

In some embodiments, the IoT system may extract the feature of gas usage behavior based on a feature extraction model. The feature extraction model is a machine learning model, for example, the feature extraction model may be a convolutional neural networks model (CNN).

In some embodiments, the IoT system may also obtain the features of gas usage behavior based on mathematical statistics of various feature items in the historical data. As an example, the change rate of gas usage is a statistical feature of gas increments of a plurality of users within the preset time period. The change rate of gas usage may be determined based on the current user gas increment and an average gas increment of all users in the time period. For example, if the average gas increment of all users in the preset time period is a, and the gas increment of the user is b (b>a), the change rate of gas usage is (b−a)/a.

The number of dimensions of the data to be uploaded is a number of types of gas data to be uploaded. The types of gas data may include gas metering data and temperature data, image data, and gas concentration data of the gas application scenario. The IoT system may obtain the data to be uploaded based on the smart gas object platform. The number of dimensions of the data to be uploaded is positively correlated with the upload demand degree.

The data volume of the data to be uploaded is a total amount of newly generated data information that has not yet been uploaded in the time period since the most recent upload time of gas data in history up to the current moment. The data volume of the data to be uploaded may include a sum of data volumes of the data to be uploaded in a plurality of different dimensions. The IoT system may obtain the data volume of the data to be uploaded based on the smart gas object platform.

In some embodiments, the IoT system may determine the upload demand degree in multiple ways. In some embodiments, the IoT system may obtain the upload demand degree based on the features of the data to be uploaded and the features of the gas usage behavior by a weighted calculation. For example, the smart gas object platform may determine the upload demand degree based on formula (1).

$$\text{Upload demand degree} = w_1 \times \text{data volume of data to be uploaded} + w_2 \times \text{number of dimensions of the data to be uploaded} + w_3 \times \text{change rate of gas usage} \quad (1)$$

$w_1$, $w_2$ and $w_3$ are all coefficients.

Some embodiments of the present disclosure may analyze, based on the gas data, the features of the gas usage behavior of the user, the data volume of the data to be uploaded, and the number of dimensions of the data to be uploaded, and predict the upload demand degree of the gas data of the user based on the above information, so that the priority degree of different gas data may be judged scientifically, and the reasonableness and efficiency of the uploading of the data may be improved.

In some embodiments, the upload demand degree is negatively correlated to a usage frequency of historical user gas. For example, when a user has a high usage frequency of historical user gas, it is demonstrated that the user generates gas data more commonly and has a lower upload demand degree. As another example, when a user has not used gas for a period of time in the past, the user's usage frequency of historical user gas is low, and when the user generates gas data, it is demonstrated that the user has resumed using gas, and the upload demand degree is higher.

In some embodiments of the present disclosure, the IoT system also determines the upload demand degree based on the usage frequency of the historical user gas, which takes into account the effect of the usage frequency on the priority of the gas data upload, and may improve the accuracy of the obtained upload demand degree.

Step 233, in response to the upload demand degree meeting a preset condition, transmitting the gas data within the preset time period to a smart gas management platform based on a smart gas object platform at a target upload time point of a smart gas meter of the gas user.

The preset condition is a judgment condition that determines whether the upload demand degree meets the preset requirements. The preset condition may include that the upload demand degree is greater than a demand degree threshold.

In some embodiments, the IoT system may determine the preset condition based on a remaining bandwidth of a channel at current time and in a future time period. The channel may be a link channel for transmission of data by a smart gas meter user. The demand degree threshold is negatively correlated with the remaining bandwidth of the channel.

The future time period may refer to a preset fixed time interval. The remaining bandwidth of the channel in the future time period may be determined based on a machine learning model, e.g., the remaining bandwidth of the channel in the future time period may be determined based on, e.g., a long short term memory network model (LSTM). The IoT system may take the remaining bandwidth in the future time period corresponding to a historical moment $T_1$ as a training sample, the future time period as t, an average remaining bandwidth in the time period $T_1+t$ as a training label, the current channel bandwidth and the data volume of the data to be uploaded as inputs, and determine the remaining bandwidth of the channel in the future time period based on the machine learning model.

A target upload time point is an upload time point that is closest to the current moment in a set of upload time points of a smart gas meter. In some embodiments, the IoT system may determine the set of upload time points at a preset cycle periodically and send the determined set of upload time points down to the smart gas meter.

The set of upload time points is a set of time points for uploading gas data. For example, a candidate set of upload time points of the smart gas meter a is ($t_{11}$, $t_{12}$ . . . ), where $t_{11}$, $t_{12}$ . . . are the time points for uploading the gas data.

In some embodiments, the IoT system may determine the set of upload time points based on a variety of ways. For example, the IoT system may count the set of upload time points for each day within a preset historical time period, and the set of upload time points corresponding to the plurality of upload time points serves as the set of upload time points for that day.

In some embodiments, the IoT system may obtain uploaded data of at least one smart gas meter at the preset cycle periodically; and determine, at least based on the uploaded data, a set of upload time points of the at least one smart gas meter.

The preset cycle is a cycle for sending down the set of upload time points to the smart gas meter and for collecting the uploaded data from the smart gas meter. For example, the preset cycle may be every four hours.

Some embodiments of the present disclosure collect data and send down the set of upload time points periodically according to the preset cycle, which is capable of ensuring the timeliness and efficiency of data acquisition and upload.

In some embodiments, the IoT system may determine the preset cycle based on current data processing features of the smart gas data center.

The current data processing features are features related to the capacity and load of the smart gas data center to process data. The current data processing features may include the performance of equipment (e.g., a processor, a storage, etc.) of the smart gas data center, the change rate of the data volume, etc.

In some embodiments, the IoT system may construct a reference vector based on the current data processing features, and a cluster center obtained from a clustering analysis of the historical data processing features may be used as a criterion vector. For example, the reference vector a may be represented as (x, y), wherein x represents a processor performance of the smart gas data center corresponding to a, and y represents a change rate of the data volume corresponding to a. By calculating a similarity between the reference vector and the criterion vector, a cycle corresponding to the criterion vector with the highest similarity is used as the preset cycle. A similarity threshold may be set based on manual setting.

Some embodiments of the present disclosure take into account the capacity and load of the smart gas data center to process data, which is capable of collecting data and processing data in a more reasonable manner to ensure data security and efficiency of data processing.

In some embodiments, the preset cycle is related to a difference between an actual congestion degree and a predicted congestion degree, and a difference between an actual demand matching degree and a predicted demand matching degree in a recent cycle.

The actual congestion degree is an actual congestion degree at the time the gas data is uploaded. In some embodiments, the IoT system may take an average of congestion at a plurality of moments in a preset time period of history and determine the actual congestion degree. In some embodiments, the IoT system may determine the actual congestion degree based on a method for determining a label when training a first evaluation model. For more information on the first evaluation model, please refer to FIG. 4 and its related contents.

The predicted congestion degree is a predicted congestion when gas data is uploaded. In some embodiments, the IoT system may determine the predicted congestion degree based on the first evaluation model.

The actual demand matching degree is a degree to which an actual bandwidth requirement for data uploads matches the data volume. In some embodiments, the IoT system may determine an average of demand matching degrees for a plurality of moments in a preset time period of history, as the actual demand matching degree. In some embodiments, the IoT system may determine the actual demand matching degree based on a method for determining a label when training a second evaluation model. For more information on the second evaluation model, please refer to FIG. 4 and its related contents.

The predicted demand matching degree is a degree to which a predicted bandwidth requirement for data uploads matches the data volume. In some embodiments, the IoT system may determine the predicted demand matching degree based on the second evaluation model.

Figure 4:
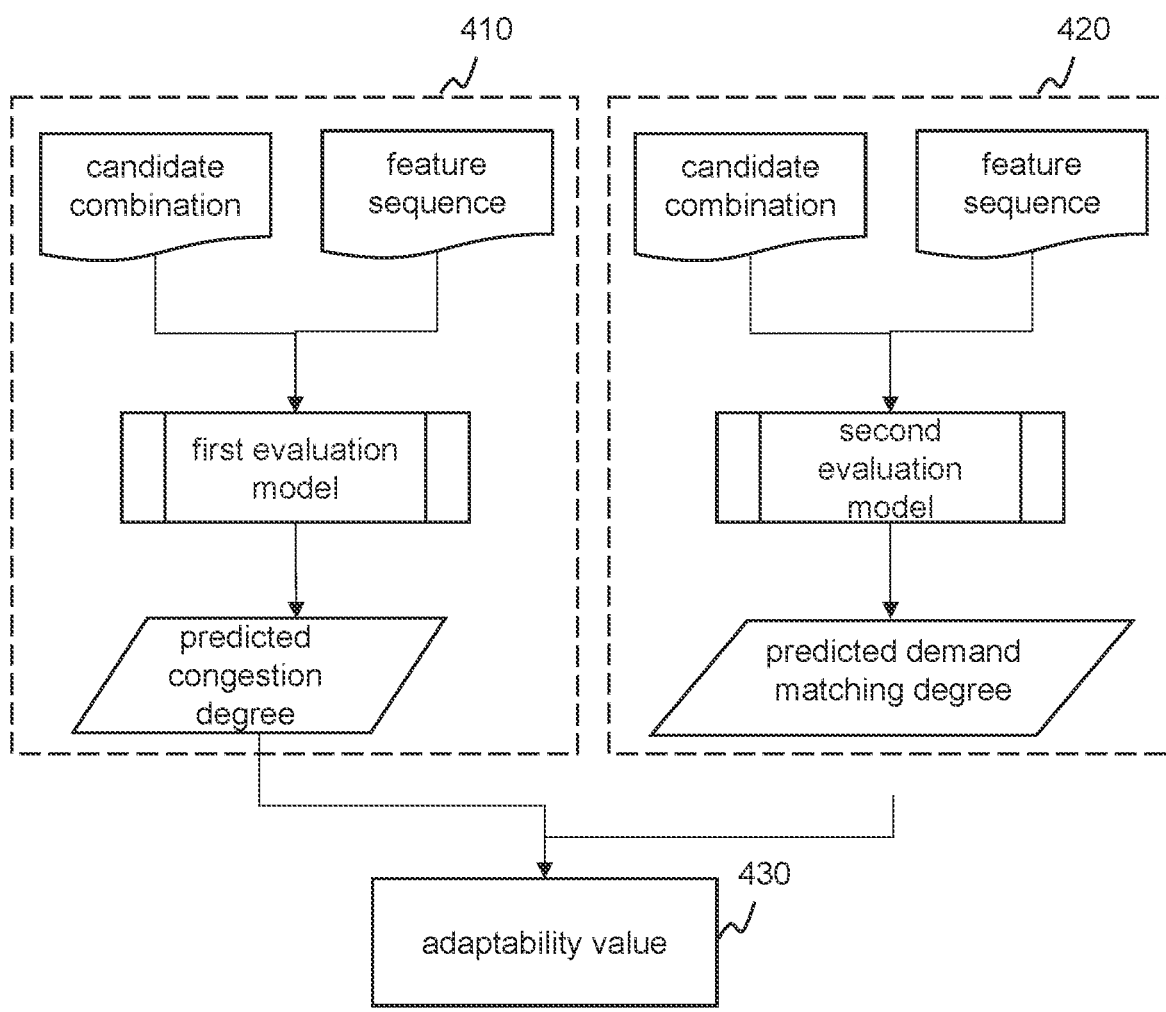
FIG. 4 is a schematic illustration of a process for determining the adaptability value according to some embodiments of the present disclosure.

For more information on the above, please refer to FIGS. 4 and 5 and their related contents.

In some embodiments, the IoT system may determine the preset cycle by looking up a table based on a first preset table. The first preset table is a table characterizing a correspondence between the preset cycle and the target difference. The target difference is a sum of a first difference and a second difference, the first difference is a difference between the actual congestion degree and the predicted congestion degree, and the second difference is a difference between the actual demand matching degree and the predicted demand matching degree. The first preset table may be established based on historical data. The preset cycle is negatively correlated with the target difference.

The uploaded data refers to gas data that has been uploaded by the smart gas meter.

In some embodiments, the IoT system may generate a plurality of candidate combinations and determine the set of upload time points of the at least one smart gas meter based on an adaptability value of the plurality of candidate combinations. For more information on the determining the set of upload time points, please refer to FIG. 3 and its related contents.

Some embodiments of the present disclosure adjust the preset cycle by a difference between actual and predicted values of demand matching and congestion, which may be adapted to keep data uploads smooth and timely in conjunction with real-time data uploads.

Some embodiments of the present disclosure, based on the gas data, determine the upload demand degree of the gas data of each smart gas meter, and then determine the respective set of upload time points, which not only enables staggered uploading of the data, ensures smooth data transmission, and avoids data collision resulting in data loss, but also reasonably arranges for the uploading of data with different priority degrees at different times, which safeguards the normal operation of the gas pipeline network, and reduces the potential gas risks.

Figure 3:
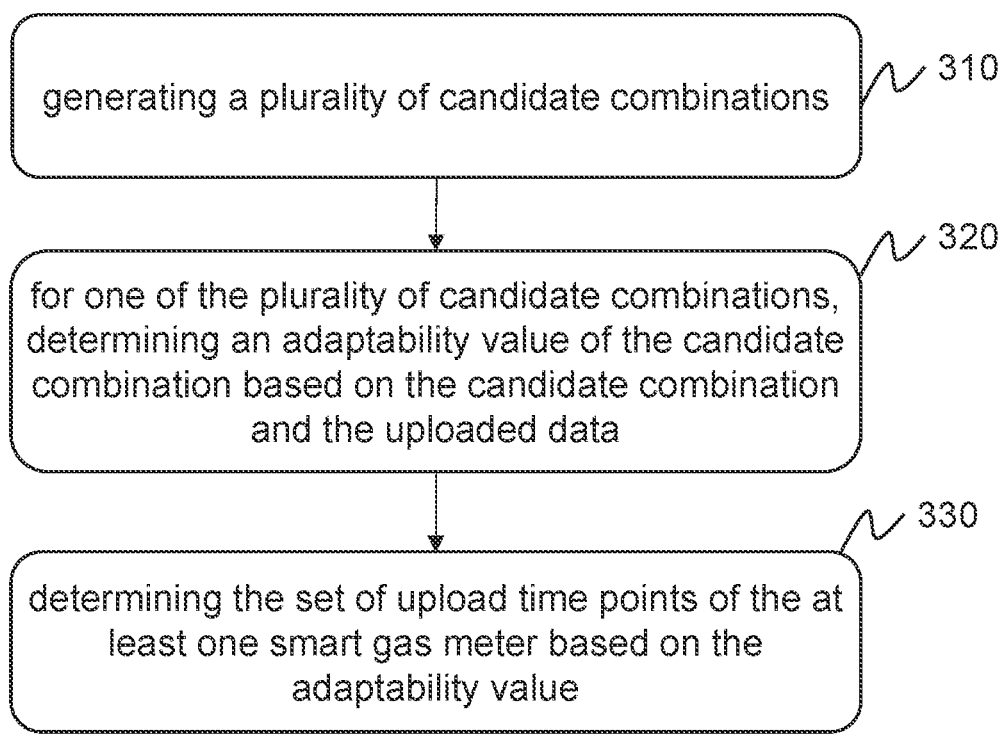
FIG. 3 is an exemplary flowchart of a process for determining the set of upload time points according to some embodiments of the present disclosure.

FIG. 3 is an exemplary flowchart of a process for determining a set of upload time points according to some embodiments of the present disclosure. In some embodiments, process 300 may be performed by the IoT system. As shown in FIG. 3, the process 300 includes the following steps.

Step 310, generating a plurality of candidate combinations.

The candidate combination refers to a combination of candidate upload time point sets, and a set of candidate combinations includes a set of candidate upload time points of the at least one smart gas meter. For example, the set of candidate combinations may be $[(t_{11}, t_{12}, \ldots), (t_{21}, t_{22}, \ldots), (t_{31}, t_{32}, \ldots), \ldots]$, wherein $(t_{11}, t_{12}, \ldots)$, $(t_{21}, t_{22}, \ldots)$ and $(t_{31}, t_{32}, \ldots)$ may represent sets of candidate upload time points of the first, second and third smart gas meters, respectively.

In some embodiments, the IoT system may generate a set of individuals, followed by at least one round iterative update of the set of individuals until an iterative completion condition is met. And the IoT system may determine a candidate combination based on the iteratively updated set of individuals. The set of individuals is a combination of individuals. The set of individuals may include a plurality of individuals, and each individual may correspond to a set of upload time point set combinations. For example, the IoT system may determine the candidate combination through steps S1 to steps S6.

Step S1: generating a set of individuals.

In some embodiments, the IoT system may encode a set of optional upload time points of the at least one gas meter, which in turn may randomly arrange combinations of the set of optional upload time points of the at least one gas meter to generate the set of individuals.

For example, supposing that a number of smart gas meters is 3, and the upload time points are 4 o'clock and 5 o'clock, each gas meter may choose to upload data or not to upload data at the above two time points, then each gas meter may have four optional upload time point sets: (1, 0), (0, 1), (0, 0) and (1, 1), where a first element of each optional upload time point set represents an upload result at 4 o'clock and a second element represents an upload result at 5 o'clock, and 1 represents uploading and 0 represents not uploading. Then the four optional sets of upload time points of each gas meter may be arranged and combined to generate 4×4×4=64 combinations.

For example, an individual in the set of individuals may be [(1, 0), (0, 1), (0, 0)], where (1, 0) represents the set of candidate upload time points of the first gas meter (i.e., uploading only at 4 o'clock), (0, 1) represents the set of candidate upload time points of the second gas meter (i.e., uploading only at 5 o'clock), and (0, 0) represents the set of candidate upload time points of the third gas meter (i.e., not uploading at either 4 o'clock or 5 o'clock).

Step S2: generating at least one new individual and adding the at least one new individual to the set of individuals.

In some embodiments, the IoT system may perform operations such as crossover, mutation, etc., on the individuals in the above set of individuals to generate new individuals. In some embodiments, a number of the new individuals may be the same as or different from a number of individuals in the original set of individuals (i.e., the set of individuals generated in S1).

In some embodiments, the IoT system may pair the individuals in the set of individuals two by two (e.g., randomly) and perform a crossover operation on the two paired individuals to obtain two new individuals. The crossover operation refers to exchanging at least one of the set of upload time points corresponding to the mutually paired individuals by a single-point crossover, a multi-point crossover, a uniform crossover, an arithmetic crossover, or the like, to generate the two new individuals. For example, two mutually paired individuals are [(1, 0), (0, 1), (0, 0)] and [(0, 0), (1, 1), (1, 0)] and (0, 1), (1, 0)], and (0, 1) in the first individual is exchanged with (1, 1) in the second individual to obtain two new individuals [(1, 0), (1, 1), (0, 0)] and [(0, 0), (0, 1), (1, 0)].

In some embodiments, the IoT system to perform a mutation operation on the individuals in the set of individuals to obtain new individuals. The mutation operation refers to making certain changes to at least one of the set of upload time points corresponding to the individuals in the set of individuals to obtain a new individual. For example, the mutation operation may be that the original individual is [(1, 0), (0, 1), (0, 0)], and (0, 1) of which is changed to (1, 1) to obtain a new individual [(1, 0), (1, 1), (0, 0)].

Step S3: calculating an adaptability value of an individual in the set of individuals.

In some embodiments, the IoT system may establish an adaptability function based on the predicted congestion degree and the predicted demand matching degree to calculate the adaptability value of the individual in the set of individuals. For example, the IoT system may determine the adaptability value based on the predicted congestion degree, and the predicted demand matching degree via formula (2).

$$\text{adaptability value} = k_1 \times \text{predicted congestion degree} + k_2 \times \text{predicted demand matching degree} \quad (2)$$

$k_1$ is a coefficient of the predicted congestion degree, and $k_2$ is a coefficient of the predicted demand matching degree. In some embodiments, $k_1$, $k_2$ may be determined based on actual requirements. For example, if the requirement for the predicted demand matching degree is high, $k_2$ may be increased accordingly. $k_1$ may be a negative value, $k_2$ may be a positive value, and the smaller the predicted congestion degree is, the larger the predicted demand matching degree is, and the larger the adaptability value is.

In some embodiments, the IoT system may determine the predicted congestion degree and the predicted demand matching degree based on the first evaluation model and the second evaluation model, respectively. For more information on the predicted congestion degree and the predicted demand matching degree, please refer to FIGS. 2 and 4 and their related contents.

Step S4: selecting individuals in the set of individuals to determine an updated set of individuals.

In some embodiments, the IoT system may establish a selection function to select individuals in the set of individuals to determine the updated set of individuals. The updated set of individuals has the same number of individuals as the original set of individuals, e.g., the updated set of individuals and the original set of individuals may both have a number of individuals.

The selection function is a function that allows for the selection of individuals. In some embodiments, the IoT system may determine the selection function based on an operator, such as roulette, to select at least one set of individuals. A probability that an individual is selected is positively correlated with an adaptability value of the individual. For example, the probability that a particular individual is selected may be an adaptability value/total adaptability value for that individual. The total adaptability value is, among other things, determined by summing the adaptability values of all individuals in the set of individuals.

Step S5: determining whether the iteration completion condition is met.

The iteration completion condition is a condition used to determine whether the iterative optimization is completed or not. For example, the number of iterations reaches a maximum value, the adaptability value reaches a preset adaptability threshold, etc. The preset adaptability threshold may be set manually.

In some embodiments, the IoT system may also compare an adaptability value (i.e., an average of the adaptability values of each individual in the set of individuals) of the set of individuals after each round of iterative optimization with the preset adaptability threshold, and when the adaptability value is greater than or equal to the preset adaptability threshold, it is determined that the iteration completion condition is met.

In some embodiments, in response to the iteration completion condition being met, the IoT system may determine the plurality of candidate combinations by performing step S6. In some embodiments, in response to the iteration completion condition not being met, the IoT system may continue by performing steps S2 to steps S5.

Step S6: determining the plurality of candidate combinations based on the iteratively updated set of individuals.

In some embodiments, in response to the iteration completion condition being met, the iterative update ends, and the IoT system may use the selected set of a individuals as the candidate combinations.

In some embodiments of the present disclosure, the IoT system determines the optimal set of individuals by iteratively optimizing the set of individuals, which may globally search for the optimal set of individuals to avoid individuals in the optimal set of individuals tending to be locally optimal; and determines candidate combinations by the optimal set of individuals, which may result in the most suitable candidate combinations.

Step 320, for one of the plurality of candidate combinations, determining an adaptability value of the candidate combination based on the candidate combination and the uploaded data.

In some embodiments, the IoT system may determine the adaptability value of the candidate combination based on the candidate combination and the uploaded data by looking up the table.

In some embodiments, the IoT system may determine the adaptability value of the candidate combinations via formula (2). For more information on the determining the adaptability value of the candidate combination, please refer to the above and its related contents.

Step 330, determining the set of upload time points of the at least one smart gas meter based on the adaptability value.

In some embodiments, the IoT system may determine the set of upload time points of the at least one smart gas meter based on the adaptability value. Since the smaller the predicted congestion degree and the larger the predicted demand matching degree is, the better the set of candidate upload time point combinations are, and since the adaptability value is negatively correlated to the predicted congestion degree and positively correlated to the predicted demand matching degree, the larger the adaptability value is, the better the set of candidate upload time point combinations are. For example, the IoT system may have the set of candidate upload time point combinations with the largest adaptability value as the final set of upload time points combinations, which in turn determines the set of upload time points of the at least one smart gas meter.

In some embodiments of the present disclosure, the set of upload time points is obtained by obtaining an optimal candidate combination, which allows determining a reasonable set of upload time points of the at least one smart gas meter.

FIG. 4 is a schematic diagram illustrating a process for determining an adaptability value according to some embodiments of the present disclosure. In some embodiments, a process 400 may be performed by the IoT system. As shown in FIG. 4, the process 400 includes the following steps.

Step 410, determining, based on the candidate combination, a feature sequence of each smart gas meter in the at least one smart gas meter, a predicted congestion degree of the candidate combination by a first evaluation model.

The feature sequence is a sequence formed by the data that has been uploaded. The feature sequence may be counted by time (e.g., counting the last 1 h of data uploading), or counted by number of times (e.g., counting the last 100 times of data uploading). In some embodiments, the feature sequence may include one or more of an upload moment, an uploaded data feature, etc. The uploaded data features may include a data volume of the uploaded data, a number of dimensions of the uploaded data, etc. For example, the feature sequence of a smart gas meter may be $[(t_1, a_1, b_1), (t_2, a_2, b_2), (t_3, a_3, b_3), \ldots]$, $(t_1, a_1, b_1)$ represents the data volume of the uploaded data at the upload moment $t_1$ as $a_1$, the number of dimensions of the uploaded data as $b_1$, and $t_1$, $t_2$, and $t_3$ in chronological order. In some embodiments, the IoT system may obtain the feature sequence based on data recorded in the smart gas data center.

The first evaluation model is a model used to determine the predicted congestion degree. The first evaluation model may be a machine learning model. For example, the first evaluation model may be any one or a combination of structures of a neural network (NN), a graph neural network (GNN), etc.

In some embodiments, inputs of the first evaluation model may include a candidate combination, a feature sequence, etc. For more information on the candidate combination, please refer to FIG. 3 and its related contents. For more information on the feature sequence, please refer to the above description.

In some embodiments, outputs of the first evaluation model may include the predicted congestion degree.

In some embodiments, the first evaluation model may be obtained by training a plurality of first training samples with a first label. The plurality of first training samples with the first label may be input into an initial first evaluation model, a loss function is constructed from the first labels and results of the initial first evaluation model, and parameters of the initial first evaluation model are iteratively updated based on the loss function. When the loss function of the initial first evaluation model meets a preset condition, the model training is completed, and the trained first evaluation model is obtained. The preset condition may be a loss function convergence, a number of iterations reaching a threshold, etc.

In some embodiments, the first training samples may include at least a combination of samples and a sequence of sample features for a first historical moment obtained from the historical data. The IoT system may calculate an average of congestion values of the gas data center at the plurality of moments in the first training samples over a period of time from the first historical moment to a second historical moment, determining the average as the first label of the first training samples. The first historical moment precedes the second historical moment. A time period from the first historical moment to the second historical moment may be preset by the IoT system. For example, the time period from the first historical moment to the second historical moment may be from the beginning time of one cycle to a time before the next cycle.

In some embodiments, the congestion value is positively correlated to a number of queued tasks of the gas data center, a bandwidth usage of the data transmission line, and a resource occupancy rate of the gas data center, and the IoT system may determine a congestion value for a certain moment based on the number of queued tasks of the gas data center, the bandwidth usage of the data transmission line, and the resource occupancy rate of the gas data center at a certain moment by a preset formula. For example, the IoT system may determine the congestion value at moment t by formula (3).

$$\text{congestion value at moment } t = \text{number of queued tasks of the gas data center at moment } t + \text{bandwidth usage of the data transmission line at moment } t + \text{resource occupancy of the gas data center at moment } t \quad (3)$$

Moment t is a historical moment between the first historical moment and the second historical moment, the number of queued tasks of the gas data center at moment t includes a number of tasks that have not yet been processed, the bandwidth occupancy of the data transmission line at moment t includes bandwidth occupancy of the wired line, the wireless line, etc., at moment t, and the resource occupancy of the gas data center at moment t includes CPU occupancy, memory occupancy, and internal IO occupancy. In some embodiments, the IoT system may obtain the above data by accessing data in the smart gas data center.

Step 420, determining, based on the candidate combination, the feature sequence of each smart gas meter in the at least one smart gas meter, a predicted demand matching degree of the candidate combination by a second evaluation model.

The second evaluation model is a model that is used to determine the predicted congestion degree. The second evaluation model may be a machine learning model. For example, any two or combination of structures in NN, GNN, etc.

In some embodiments, inputs of the second evaluation model may include the candidate combination and the feature sequence, etc. For more information on the candidate combination, please refer to FIG. 3 and its related contents. For more information on the feature sequence, please refer to the description above.

In some embodiments, outputs of the second evaluation model may include the predicted demand matching degree.

In some embodiments, the second evaluation model may be obtained by training a plurality of second training samples with second labels. The process of training the second evaluation model by the second training samples is similar to the process of training the first evaluation model by the first training samples and is not described herein.

In some embodiments, the second training samples may include at least a combination of samples and a sequence of sample features for a third historical moment obtained from the historical data. The IoT system may calculate an average of demand matching for individual smart gas meters for the second training samples over a time period from the third historical moment to a fourth historical moment, determining the average as the second label for the second training samples. The third historical moment precedes the fourth historical moment. A time period from the third historical moment to the fourth historical moment may be preset by the IoT system. For example, the time period from the third historical moment to the fourth historical moment may be from the beginning time of one cycle to a time before the next cycle.

In some embodiments, the IoT system may calculate a demand matching value based on a difference p between an actual time point of uploaded data for each upload of the smart gas meter during the time period from the third historical moment to the fourth historical moment and a time point of uploaded data reaching the uploaded demand degree threshold. Next, the IoT system may calculate a sum s of the difference between the actual time point of the uploaded data corresponding to each of the multiple uploads of the data during the time period from the third historical moment to the fourth historical moment, and the time point of the uploaded data reaching the upload demand degree threshold. That is, $s=p_1+p_2+p_3, \ldots$, s is negatively correlated with the demand matching value, and the IoT system may calculate the demand matching value based on s using the formula (e.g., demand matching value=1/s, etc.).

For example, a certain smart gas meter A has experienced three data uploads during the time period from the third historical moment to the fourth historical moment. For the first time, the smart gas meter A reaches the upload demand degree threshold at 8:30, and the smart gas meter A inquires about the nearest upload time point from its own set of upload time points, and finds that 8:35 is the nearest upload time point from the current moment in the set of upload time points, and the smart gas meter A performs the data upload at 8:35, and 8:35 is the actual time point, so that $p_1$=8:35−8:30=5 min. For the second time, the smart gas meter A reaches the upload demand degree threshold at 9:20, and the most recent upload time point is 9:28, then $p_2$=9:28−9:20=8 min. For the third time, the smart gas meter A reaches the upload demand degree threshold at 11:34, and the most recent upload time point is 11:42, then $p_3$=11:42−11:34=8 min. Next, the IoT system may calculate 5=5+8+8=21, which further determines that the demand matching value=1/21.

Step 430, determining the adaptability value of the candidate combination based on the predicted congestion degree and the predicted demand matching degree.

In some embodiments, the IoT system may determine the adaptability value of the candidate combination based on the predicted congestion degree, and the predicted demand matching degree via formula (2). For more information on the determining the adaptability value, please refer to FIG. 3 and its related contents.

Some embodiments of the present disclosure, by utilizing the first evaluation model, and the second evaluation model to predict the adaptability value based on the optimal candidate combination, may improve the accuracy of the predicted adaptability value.

Some embodiments of the present disclosure provide a non-transitory computer-readable storage medium, comprising a set of instructions, wherein when a computer reads the computer instructions in the storage medium, the method for controlling data transmission for smart gas is implemented.

The embodiments in the present disclosure are intended to be exemplary and illustrative only and do not limit the scope of application of the present disclosure. Various amendments and changes that may be made under the guidance of the present disclosure remain within the scope of the present disclosure for those skilled in the art.

Certain features, structures, or characteristics of one or more embodiments of the present disclosure may be suitably combined.

What is claimed is:

1. A method for controlling data transmission for smart gas, wherein the method is performed by an Internet of Things (IOT) system for controlling data transmission for smart gas, the method comprising:
   obtaining gas data of a gas user continuously, and storing the gas data into a storage unit;
   predicting a probability of full storage of the storage unit within a preset future time period based on a historical data increment of the storage unit;
   in response to the probability of full storage meeting a preset probability condition:
      obtaining the gas data of the gas user within the preset time period from the storage unit;
      determining an upload demand degree of the gas data based on the gas data; and
      in response to the upload demand degree meeting a preset condition, transmitting the gas data within the preset time period to a smart gas management platform based on a smart gas object platform at a target upload time point of a smart gas meter of the gas user, wherein the target upload time point is a next most recent upload time point in a set of upload time points of the smart gas meter,
      obtaining, by the smart gas management platform, uploaded data of at least one smart gas meter at a preset cycle periodically, and determining the set of upload time points of the at least one smart gas meter based on the uploaded data and sending the set of upload time points of the at least one smart gas meter to the smart gas meter, including:
generating a plurality of candidate combinations, one of the plurality of candidate combinations including a set of candidate upload time points of the at least one smart gas meter;
for one of the plurality of candidate combinations, determining an adaptability value of the candidate combination based on the candidate combination and the uploaded data, the adaptability value being determined based on a predicted congestion degree and a predicted demand matching degree; and
determining the set of upload time points of the at least one smart gas meter based on the adaptability value, wherein
the preset cycle is related to a difference between an actual congestion degree and a predicted congestion degree, and a difference between an actual demand matching degree and a predicted demand matching degree in a most recent cycle.

2. The method of claim 1, wherein the determining an upload demand degree of the gas data based on the gas data includes:
determining a feature of data to be uploaded and a feature of gas usage behavior of the gas user based on the gas data within the preset time period; and
determining the upload demand degree based on the feature of data to be uploaded and the feature of gas usage behavior.

3. The method of claim 2, wherein the upload demand degree is negatively correlated to a historical gas usage frequency of the gas user.

4. The method of claim 1, wherein the smart gas management platform includes a smart gas data center, and the preset cycle is determined by a process including:
determining the preset cycle based on a current data processing feature of the smart gas data center.

5. A non-transitory computer-readable storage medium, comprising a set of instructions, wherein when a computer reads the computer instructions in the storage medium, the method for controlling data transmission for smart gas of claim 1 is implemented.

6. An Internet of Things (IOT) system for controlling data transmission control for smart gas, wherein the system comprises a smart gas user platform, a smart gas service platform, a smart gas management platform, a smart gas sensing network platform, and a smart gas object platform interacting in sequence, and the IoT system for controlling data transmission control for smart gas is configured to:
obtain gas data of a gas user continuously, and storing the gas data into a storage unit;
predict a probability of full storage of the storage unit within a preset future time period based on a historical data increment of the storage unit;
in response to the probability of full storage meeting a preset probability condition:
obtain the gas data of the gas user within the preset time period from the storage unit;
determine an upload demand degree of the gas data based on the gas data; and
in response to the upload demand degree meeting a preset condition, transmit the gas data within the preset time period to the smart gas management platform based on the smart gas object platform at a target upload time point of a smart gas meter of the gas user, wherein the target upload time point is a next most recent upload time point in a set of upload time points of the smart gas meter,
obtain, by the smart gas management platform, uploaded data of at least one smart gas meter at a preset cycle periodically, and determine the set of upload time points of the at least one smart gas meter based on the uploaded data and send the set of upload time points of the at least one smart gas meter to the smart gas meter, including:
generating a plurality of candidate combinations, one of the plurality of candidate combinations including a set of candidate upload time points of the at least one smart gas meter;
for one of the plurality of candidate combinations, determining an adaptability value of the candidate combination based on the candidate combination and the uploaded data, the adaptability value being determined based on a predicted congestion degree and a predicted demand matching degree; and
determining the set of upload time points of the at least one smart gas meter based on the adaptability value, wherein
the preset cycle is related to a difference between an actual congestion degree and a predicted congestion degree, and a difference between an actual demand matching degree and a predicted demand matching degree in a most recent cycle.

7. The IoT system of claim 6, wherein the smart gas management platform includes a gas business management sub-platform, a non-gas business management sub-platform and a smart gas data center;
the gas business management sub-platform interacts bi-directionally with the smart gas data center, the non-gas business management sub-platform interacts bi-directionally with the smart gas data center, and the gas business management sub-platform and the non-gas business management sub-platform obtains data and feeds back corresponding operation information from the smart gas data center.

* * * * *